United States Patent
Liang (10) Patent No.: US 10,024,390 B2
(45) Date of Patent: Jul. 17, 2018

(54) PANCAKE MOTOR

(71) Applicants: SAFEWAY ELECTRO-MECHANICAL CO., LTD., New Taipei (TW); Chia-Sheng Liang, Taipei (TW)

(72) Inventor: Chia-Sheng Liang, Taipei (TW)

(73) Assignees: SAFEWAY ELECTRO-MECHANICAL CO., LTD., New Taipei (TW); Chia-Sheng Liang, Taipei (TW)

( * ) Notice: Subject to any disclaimer, the term of this patent is extended or adjusted under 35 U.S.C. 154(b) by 184 days.

(21) Appl. No.: 15/241,839

(22) Filed: Aug. 19, 2016

(65) Prior Publication Data

US 2018/0003266 A1 Jan. 4, 2018

(30) Foreign Application Priority Data

Jul. 1, 2016 (TW) .............................. 105120946 A (51) Int. Cl.
| | |
|---|---|
| *F16H 1/32* | (2006.01) |
| *F16H 1/28* | (2006.01) |
| *F16H 57/08* | (2006.01) |
| *H02K 7/116* | (2006.01) |

(52) U.S. Cl.
CPC ............. *F16H 1/28* (2013.01); *F16H 57/082* (2013.01); *H02K 7/116* (2013.01)

(58) Field of Classification Search
CPC ... F16H 1/28; F16H 1/32; F16H 57/08; F16H 57/082; H02K 7/116
See application file for complete search history.

(56) References Cited

U.S. PATENT DOCUMENTS

| | | | |
|---|---|---|---|
| 5,711,736 A | * | 1/1998 | Kyodo .................... F16H 13/06 475/149 |
| 6,031,308 A | | 2/2000 | Kinoshita et al. |
| 6,196,347 B1 | | 3/2001 | Chao et al. |
| 6,296,072 B1 | | 10/2001 | Turner |
| 6,629,574 B2 | | 10/2003 | Turner |
| 7,886,858 B2 | | 2/2011 | Ai |

\* cited by examiner

*Primary Examiner* — Mark J Beauchaine
(74) *Attorney, Agent, or Firm* — Chun-Ming Shih (57) ABSTRACT

A gear motor for decreasing speed at a mechanical power output is provided with a housing; an electric motor including an outer stator and a rotor surrounded and driven by the outer stator; a planetary gear train including planet gear assemblies, a stationary ring gear at one end of the planet gear assemblies, and a driving ring gear at the other end of the planet gear assemblies. Each planet gear assembly includes a first gear and a second gear coaxial with and co-rotated with the first gear. The first and second gears are disposed in a carrier. The first gear meshes the stationary ring gear. The second gear meshes the driving ring gear. A driving shaft is rotatably disposed through the housing and secured to the driving ring gear as a mechanical power output.

17 Claims, 7 Drawing Sheets

PANCAKE MOTOR

BACKGROUND OF THE INVENTION

1. Technical Field

The invention relates to gear motors and more particularly to a pancake motor.

2. Related Art

Conventionally, a gear motor is an electric motor having a reduction gear assembly or a non-gear type speed reduction mechanism. For achieving a low speed and high torque output, a motor is required to have an increased size and thus has an increased manufacturing cost. To the contrary, for achieving a high speed and low torque output, a motor is required to have a decreased size and thus has a decreased manufacturing cost. The reduction gear assembly can lower an input speed and increase output torque of a motor. Motors having a reduction gear assembly are widely employed in elevators, winches, robots, etc. Another application of the reduction gear assembly is in a camera.

Gear motors can be found in patent literature such as U.S. Pat. Nos. 6,196,347, 6,296,072, and 6,629,574 which all are directed to electric bicycles having a reduction gear assembly for saving labor when pedaling. U.S. Pat. No. 6,031,308 discloses a small geared motor for use in a camera.

Conventionally, for a gear motor having a reduction gear assembly, a pinion is attached to an open end of a driving shaft and meshes a gear or gear train. Alternatively, a worm is attached to an open end of a driving shaft and meshes a worn gear. In any of above U.S. Pat. Nos. 6,196,347, 6,296,072, 6,629,574, and 6,031,308, a planetary gear train is attached to an open end of a driving shaft. U.S. Each of U.S. Pat. Nos. 6,196,347 and 6,031,308 discloses a reduction gear assembly having a Ferguson's mechanical paradox gear. Each of U.S. Pat. Nos. 6,296,072 and 6,629,574 discloses a reduction gear assembly having a two-stage speed reduction arrangement.

However, the gear motors of the patents having a reduction gear assembly are bulky. Specifically, length of the driving shaft is excessive. Hence, the prior art gear motors are not appropriate for installation in a limited space.

Conventional torque motors are pancake motors having a short driving shaft. Load is directly attached to an end of the driving shaft rather than a reduction gear assembly. This is a compact arrangement and can achieve a low speed and high torque output. However, it still suffers bulkiness and high manufacturing cost.

U.S. Pat. No. 7,886,858 discloses a pancake motor in combination with a planetary gear train for solving the problem of bulkiness and shortening the axial length. For example, a rotor (or a rotor shaft of a carrier of a planetary gear train) is attached to a driving shaft which is in turn attached to a hub spindle. They are supported by a hub bearing sub-assembly. However, strong vibration can occur when the axially attached arrangement rotates in high speed. Further, there is no teaching of the difference of the number of teeth between stationary ring gear and driving ring gear and the optimum number of the planet gears of the planetary gear train.

BRIEF SUMMARY

It is therefore, in one aspect, the invention is to provide a gear motor comprising a housing; an electric motor including an outer stator and a rotor surrounded and driven by the outer stator; a planetary gear train including a plurality of planet gear assemblies, a stationary ring gear at one end of the planet gear assemblies, and a driving ring gear at the other end of the planet gear assemblies wherein the planet gear assemblies are positioned between the stationary ring gear and the driving ring gear, each planet gear assembly includes a first gear and a second gear coaxial with and co-rotated with the first gear, the first and second gears are disposed in a carrier, the first gear meshes the stationary ring gear, and the second gear meshes the driving ring gear; and a driving shaft rotatably disposed through the housing and secured to the driving ring gear as a power output; wherein the rotor and the carrier are secured together to form an annular rotor having a central opening put on the driving shaft, two spaces are formed at two ends of the carrier respectively, each space being configured to receive either the stationary ring gear or the driving ring gear, the number of the teeth of the first gear is equal to that of the teeth of the second gear, the number of the teeth of the stationary ring gear is different from that of the teeth of the driving ring gear, and a difference between the number of the teeth of the stationary ring gear and that of the teeth of the driving ring gear is a multiple of the number of the planet gear assemblies.

Preferably, a difference between the number of the teeth of the stationary ring gear and the number of the teeth of the driving ring gear is equal to the number of the planet gear assemblies.

Preferably, the modulus of the first gear is different from the modulus of the second gear, the modulus of the first gear is equal to that of the first gear, and the modulus of the driving ring gear is equal to that of the second gear.

Preferably, the stationary ring gear is fastened in the housing.

Preferably, further comprises first and second carrier discs disposed at two ends of the planet gear assemblies respectively, the first and second carrier discs constrain the planet gear assembly in position, and the first and second gears are configured to rotate about the driving shaft.

Preferably, further comprises a plurality of axles each disposed through the first and second gears of each planet gear assembly, and two ends of each axle engage the first and second carrier discs respectively.

Preferably, further comprises a disc for attaching the driving ring gear to the driving shaft.

Preferably, the electric motor is a brushless direct current motor.

Preferably, further comprises an annular plate for fastening the outer rotor and the inner carrier together, and the spaces are disposed at two ends of both the annular plate and the carrier respectively.

The above-mentioned invention has the following advantages: two ring gears are taken as a replacement of the sun gear in the conventional planetary gear train. The two ring gears of the planetary gear train are disposed at two ends of the motor respectively. A high speed reduction ratio of the gear motor can be expressed below. The number of the teeth of the driving ring gear is divided by a number which is obtained by taking the number of the teeth of the stationary ring gear away from the number of the teeth of the driving ring gear. One power output is implemented. Space of the gear motor is greatly decreased. The number of components is decreased to simplify the construction. A pancake motor (i.e., a gear motor having an extremely flat profile) is implemented.

In another aspect, the invention is to provide a gear motor comprising a housing having a first shell and a second shell, the second shell including a central opening and releasably secured to the first shell; an electric motor disposed in the housing and including an outer stator and a rotor surrounded and driven by the outer stator; a planetary gear train disposed in the housing and including a plurality of planet gear assemblies, a stationary ring gear at one end of the planet gear assemblies, and a driving ring gear at the other end of the planet gear assemblies wherein the planet gear assemblies are positioned between the stationary ring gear and the driving ring gear, each planet gear assembly includes a first gear and a second gear coaxial with and co-rotated with the first gear, the first and second gears are disposed in a carrier, the first gear meshes the stationary ring gear, and the second gear meshes the driving ring gear; a power output secured to the driving ring gear, the power output rotatably disposed through the central opening of the second shell to be exposed on the housing; and a support cylinder disposed on a center of one surface of the first shell opposing the second shell, the support cylinder extending toward the second shell; wherein the rotor and the carrier are secured together to form an annular rotor having a central opening put on the support cylinder, two spaces are formed at two ends of the carrier respectively, each space being configured to receive either the stationary ring gear or the driving ring gear, the number of the teeth of the first gear is equal to that of the teeth of the second gear, the number of the teeth of the stationary ring gear is different from that of the teeth of the driving ring gear, and a difference between the number of the teeth of the stationary ring gear and that of the teeth of the driving ring gear is a multiple of the number of the planet gear assemblies.

The above-mentioned the invention has the following advantages: two ring gears are taken as a replacement of the sun gear in the conventional planetary gear train. The two ring gears of the planetary gear train are disposed at two ends of the motor respectively. One power output is implemented. A high speed reduction ratio of the gear motor can be expressed below. The number of the teeth of the driving ring gear is divided by a number which is obtained by taking the number of the teeth of the stationary ring gear away from the number of the teeth of the driving ring gear. Space of the gear motor is greatly decreased. The number of components is decreased to simplify the construction. A pancake motor (i.e., a gear motor having an extremely flat profile) is implemented.

In still another aspect, the invention is to provide a gear motor comprising a housing having a first shell and a second shell, the second shell including a central opening and releasably secured to the first shell; an electric motor disposed in the housing and including an outer stator and a rotor surrounded and driven by the outer stator; a planetary gear train disposed in the housing and including a plurality of planet gear assemblies, a stationary ring gear at one end of the planet gear assemblies, and a driving ring gear at the other end of the planet gear assemblies wherein the planet gear assemblies are positioned between the stationary ring gear and the driving ring gear, each planet gear assembly includes a first gear and a second gear coaxial with and co-rotated with the first gear, the first and second gears are disposed in a carrier, the first gear meshes the stationary ring gear, and the second gear meshes the driving ring gear; a power output secured to the driving ring gear, the power output rotatably disposed through the central opening of the second shell to be exposed on the housing; and a support cylinder disposed on a center of one surface of the first shell facing the second shell, the support cylinder extending toward the second shell; wherein the rotor and the carrier are secured together to form an annular rotor having a central opening put on the support cylinder, two spaces are formed at two ends of the carrier respectively, each space being configured to receive either the stationary ring gear or the driving ring gear, the number of the teeth of the first gear is equal to that of the teeth of the second gear, the number of the teeth of the stationary ring gear is different from that of the teeth of the driving ring gear, and a difference between the number of the teeth of the stationary ring gear and that of the teeth of the driving ring gear is a multiple of the number of the planet gear assemblies.

The above-mentioned invention has the following advantages: two ring gears are taken as a replacement of the sun gear in the conventional planetary gear train. The two ring gears of the planetary gear train are disposed at two ends of the motor respectively. Two power outputs are implemented. A high speed reduction ratio of the gear motor can be expressed below. The number of the teeth of the driving ring gear is divided by a number which is obtained by taking the number of the teeth of the stationary ring gear away from the number of the teeth of the driving ring gear. Space of the gear motor is greatly decreased. The number of components is decreased to simplify the construction. A pancake motor (i.e., a gear motor having an extremely flat profile) is implemented.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring to FIGS. 1 to 6, a gear motor in accordance with a first preferred embodiment of the invention comprises a housing 10, an electric motor (e.g., brushless direct current motor) 20 and a planetary gear train 30 as discussed in detail below.

Figure 1:
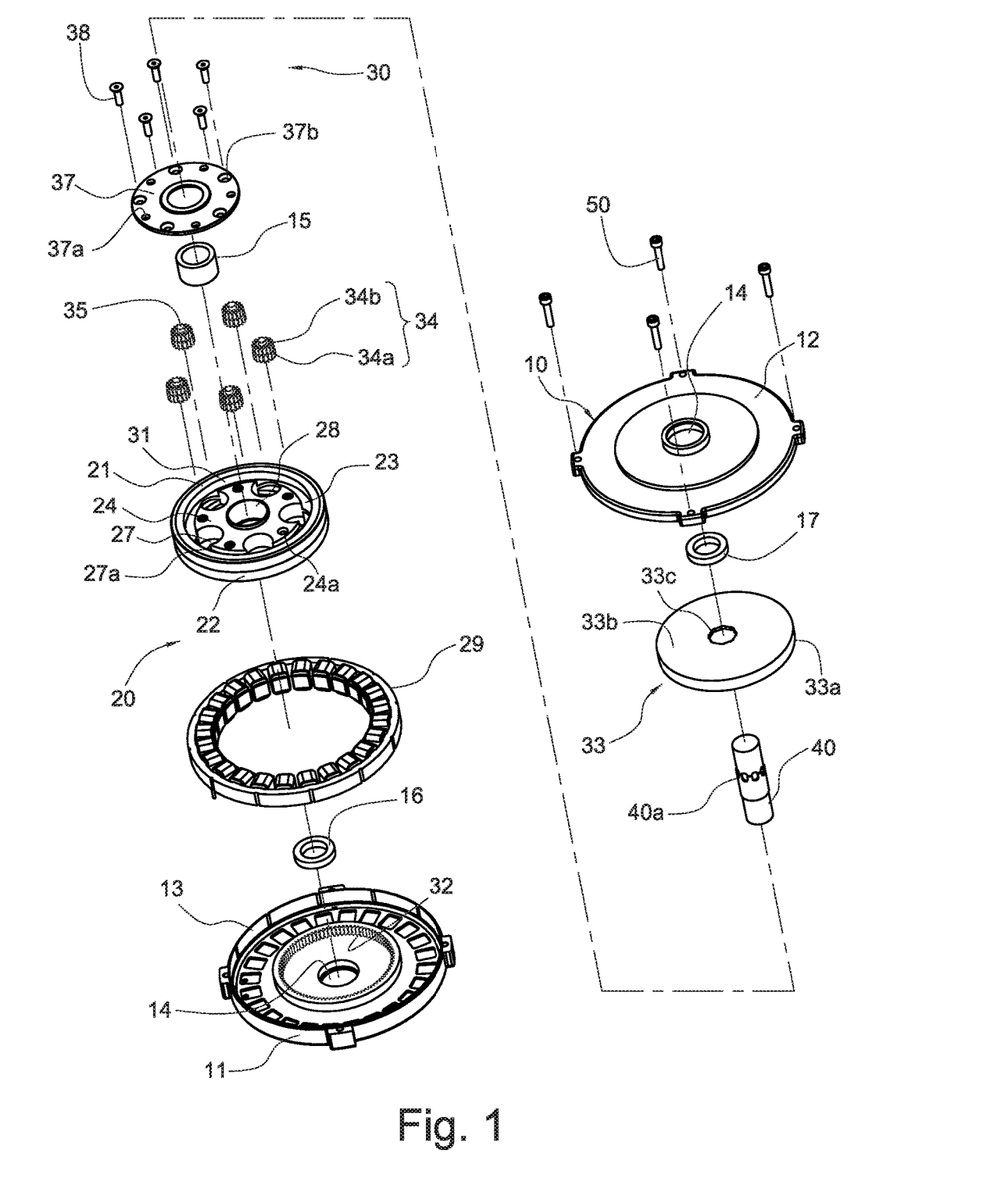
FIG. 1 is an exploded view of a gear motor according to a first preferred embodiment of the invention.
Figure 6:
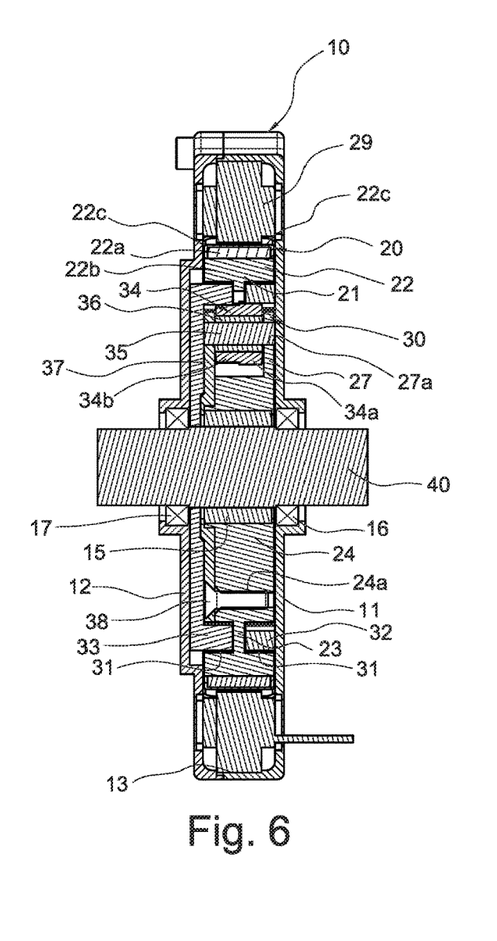
FIG. 6 is a sectional view taken along line A-A of FIG. 5.

As shown in FIGS. 1 and 6, the housing 10 includes a first shell 11 and a second shell 12 threadedly secured to the first shell 11 to define a space 13 in the housing 10. The housing 10 is for housing the gear motor. The space 13 is for housing both the electric motor 20 and the planetary gear train 30.

The electric motor 20 is a pancake motor and is the power source of the gear motor. The electric motor 20 includes an annular rotor 21 having a central opening 28 with a driving shaft 40 passing through, and a disc shaped rotor 22 secured to one end of the annular rotor 21. Each of the first and second shells 11, 12 has a central hole 14 so that the driving shaft 40 may pass through the holes 14. A first bearing 16 is mounted between the hole 14 of the first shell 11 and a second bearing 17 is mounted between the hole 14 of the second shell 12 respectively so that the driving shaft 40 may rotate in the first and second bearings 16, 17. A load (not shown) is attached to one end of the driving shaft 40 having a low rotational speed. A third bearing 15 is mounted between the central opening 28 and the driving shaft 40 so that the annular rotor 21 is supported by the driving shaft 40. The rotor 22 is also supported by the driving shaft 40 because it is secured to the annular rotor 21. Thus, the rotor 22 can co-rotate with the driving shaft 40. The rotor 22 includes a ring shaped permanent magnet 22a having a north (N) magnetic pole and a south (S) magnetic pole, a disc-shaped magnetic seat 22b attached to the permanent magnet 22a, and two magnetic protection rings 22c, which protect magnet from flying away caused by centrifugal force, attached to the magnetic seat 22b and the permanent magnet 22a respectively.

The motor 20 further comprises a ring shaped stator 29 secured to inner surfaces of the edges of the housing 10. According to Ampere's law, current through a wire (e.g., windings of the stator 29) produces a magnetic field. Further, the magnetic field interacts with the magnetic field of the permanent magnet 22a to rotate the rotor 22, i.e., the motor 20 being rotated.

Figure 2:
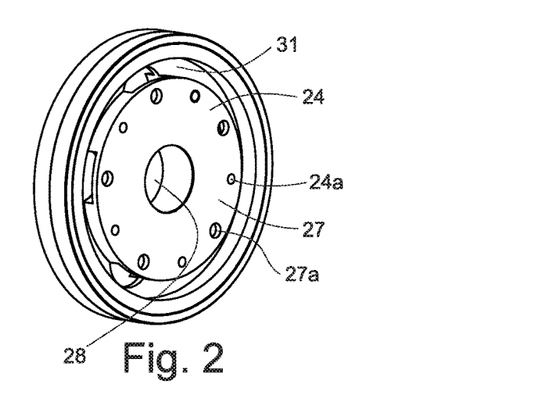
FIG. 2 is a perspective view of the annular rotor.
Figure 3:
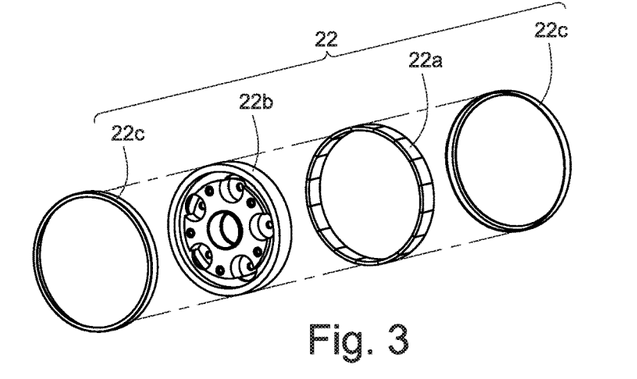
FIG. 3 is an exploded view of the rotor.

In the annular rotor 21 there are further provided a carrier 24 for supporting the planetary gear train 30, an annular plate 23 around the carrier 24, and an annular space 31 between the carrier 24 and the annular plate 23 at either end of the annular rotor 21. The planetary gear train 30 is provided in the spaces 31 and includes a stationary ring gear 32, a plurality of planet gear assemblies 34 and a driving ring gear 33a. Alternatively, only one planet gear assembly 34 is provided in other embodiments.

Figure 4:
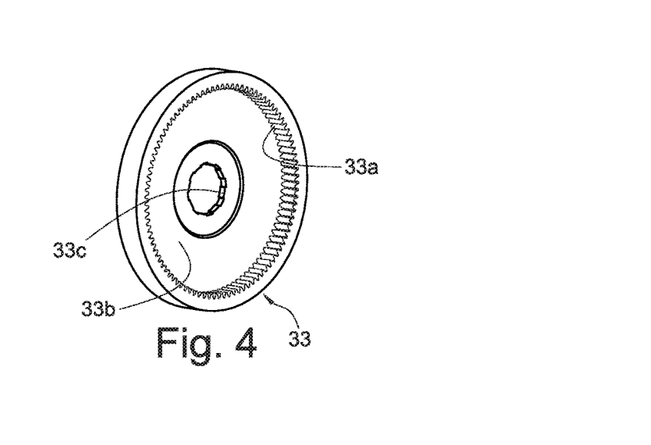
FIG. 4 is a perspective view of the driving ring gear.
Figure 5:
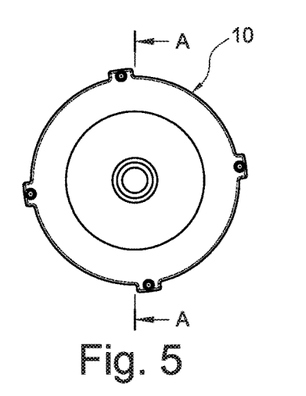
FIG. 5 is an end view of the assembled gear motor.

The driving ring gear 33a is provided in one space 31. A disc 33b is formed on one end of the driving ring gear 33a. A splined hole 33c is formed through a center of the disc 33b. Splines 40a formed on the driving shaft 40 mesh the splined hole 33c to assemble the driving shaft 40 and the driving ring gear 33a. The driving ring gear 33a, the disc 33b and the splined hole 33c are integral parts of a driving ring gear unit 33. The driving ring gear unit 33 may co-rotate with the driving shaft 40. The stationary ring gear 32 is provided in the other space 31 and secured to the first shell 11.

The number of the planet gear assemblies 34 is five and the planet gear assemblies 34 are equally spaced apart in both the driving ring gear 33a and the stationary ring gear 32. First and second carrier discs 27 and 37 are provided on both ends of the planet gear assemblies 34 respectively. The first carrier disc 27 can be either a separate part or is integrally formed with the carrier 24 in the annular rotor 21. The planet gear assembly 34 includes a first gear 34a and a second gear 34b. Each of a plurality of axles 35 is provided through a center of the planet gear assembly 34. A fourth bearing 36 is provided between the axle 35 and the planet gear assembly 34. A plurality of holes 27a are equally spaced apart along a periphery of the first carrier disc 27 and a plurality of holes 37a are equally spaced apart along a periphery of the second carrier disc 37 respectively. Two ends of the axle 35 are disposed in the aligned holes 27a and 37a respectively.

A plurality of hole members 37b are equally spaced apart along the periphery of the second carrier disc 37. The holes 37a and the hole members 37b are arranged in an alternate fashion. A plurality of threaded holes 24a are equally spaced apart along the periphery of the carrier 24. The threaded holes 24a and the holes 27a are arranged in an alternate fashion. A plurality of screws 38 are driven through the hole members 37b into the threaded holes 24a to fasten the second carrier disc 37 and the carrier 24 together. As a result, the planet gear assemblies 34 are positioned between the first carrier disc 27 and the second carrier disc 37. As discussed above, the third bearing 15 is mounted between the central opening 28 and the driving shaft 40 so that the annular rotor 21 is supported by the driving shaft 40. The planet gear assemblies 34 are disposed on the carrier 24 and in the annular rotor 21, and retained by the first and second carrier discs 27 and 37. Thus, the planet gear assemblies 34 may rotate about the driving shaft 40.

As shown in FIG. 6 specifically, the first gear 34a meshes the stationary ring gear 32 and the second gear 34b meshes the driving ring gear 33a respectively. The first gear 34a may rotate as the annular rotor 21 rotates. The second gear 34b driven by the first gear 34a may rotate the driving ring gear 33a. The driving ring gear 33a thus rotates in low speed.

A conventional planetary gear train includes a carrier, a sun gear, a plurality of planet gears supported by the carrier, and an annular gear. The planetary gear train 30 of the invention includes the carrier 24, the two ring gears 32 and 33a as a replacement of the sun gear, etc. The conventional planetary gear train only extends toward one end of the gear motor. To the contrary, the ring gears 32 and 33a of the planetary gear train 30 of the invention are disposed at two ends of the motor 20 respectively. As a result, space occupied by the gear motor of the invention is greatly decreased.

The number of the teeth of the stationary ring gear 32 is different from that of the teeth of the driving ring gear 33a. In detail, the number of the teeth of the stationary ring gear 32 is an integer A, the number of the teeth of the driving ring gear 33a is an integer B, and A is not equal to B. Further, the modulus of the first gear 34a is different from the modulus of the second gear 34b. In detail, the modulus of the first gear 34a is X, the modulus of the second gear 34b is Y, and X is not equal to Y. The modulus of the stationary ring gear 32 is X because the stationary ring gear 32 meshes the first gear 34a. Similarly, the modulus of the driving ring gear 33a is Y because the driving ring gear 33a meshes the second gear 34b.

According to Ampere's law, current through a wire (e.g., windings of the stator 29) produces a magnetic field. Further, the magnetic field interacts with the magnetic field of the permanent magnet 22a to rotate the rotor 22. The rotor 22 in turn rotates the annular rotor 21. Further, the carrier 24 rotates to cause the planet gear assemblies 34 to rotate about the driving shaft 40. The first gears 34a, meshing the stationary ring gear 32, rotate. The first and second gears 34a, 34b are arranged coaxially and co-rotated. In response to rotating the first gear 34a, the second gear 34b also rotates. That is, each of the first and second gears 34a, 34b turns and together they move around the driving shaft 40. For decreasing speed of the driving shaft 40 at its output, the first gears 34a having the modulus X mesh the stationary ring gear 32 having the number of the teeth being A, and the second gears 34b having the modulus Y mesh the driving ring gear 33a having the number of the teeth being B. The stationary ring gear 32 is fastened in the housing 10 and not rotatable. The driving ring gear 33a, having the number of the teeth being B which is different from the number of the teeth being A of the stationary ring gear 32, may rotate the driving ring gear 33a in a low speed. As a result, speed of the driving shaft 40 at its output (i.e., load) is decreased. Speed reduction ratio of the gear motor of the first preferred embodiment of invention can be expressed below.

The number of the teeth of the driving ring gear is divided by a number which is obtained by taking the number of the teeth of the stationary ring gear away from the number of the teeth of the driving ring gear.

It is noted that the number, obtained by taking the number of the teeth of the stationary ring gear away from the number of the teeth of the driving ring gear, is a multiple of the number of the planet gear assemblies 34. A maximum speed reduction ratio is obtained when the multiple is one.

Figure 7:
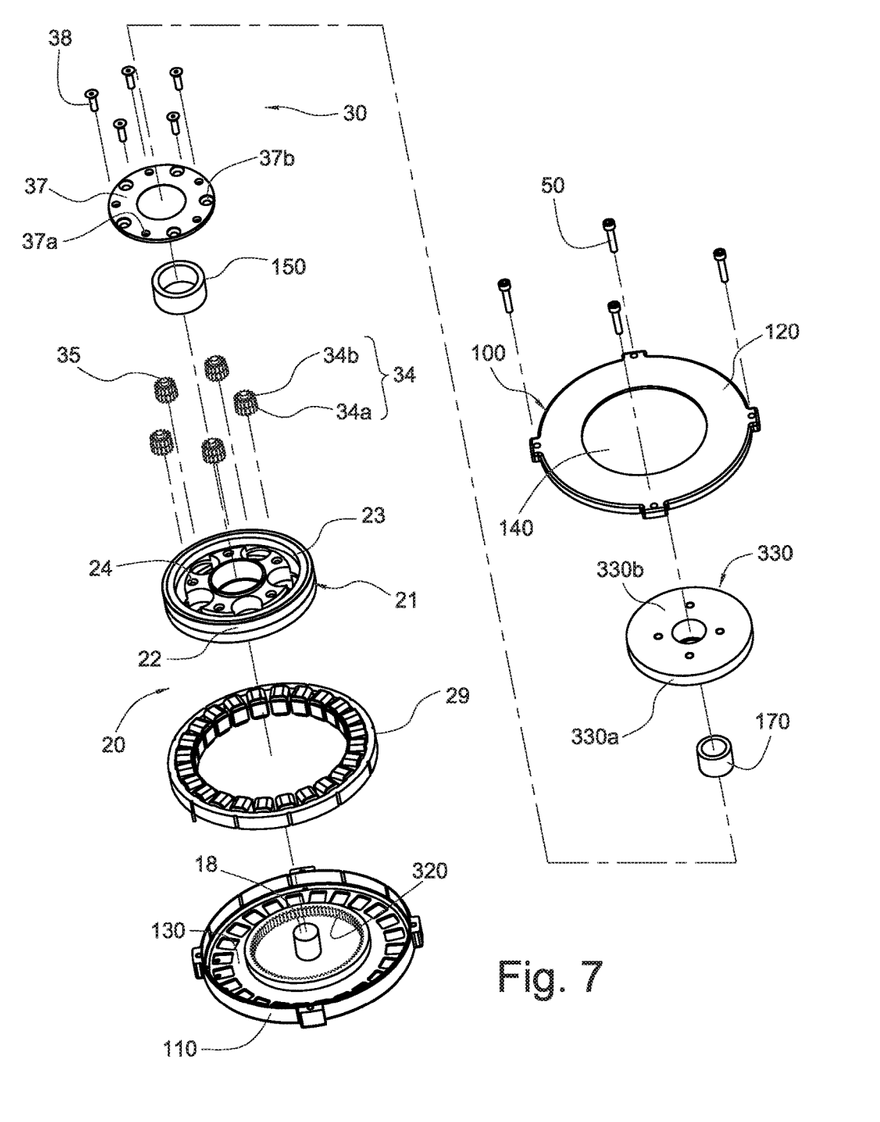
FIG. 7 is an exploded view of a gear motor according to a second preferred embodiment of the invention.
Figure 8:
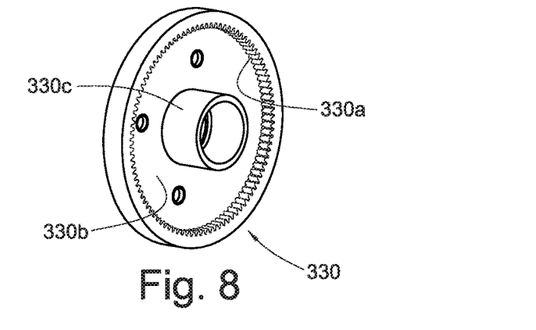
FIG. 8 is a perspective view of the driving ring gear of FIG. 7.
Figure 9:
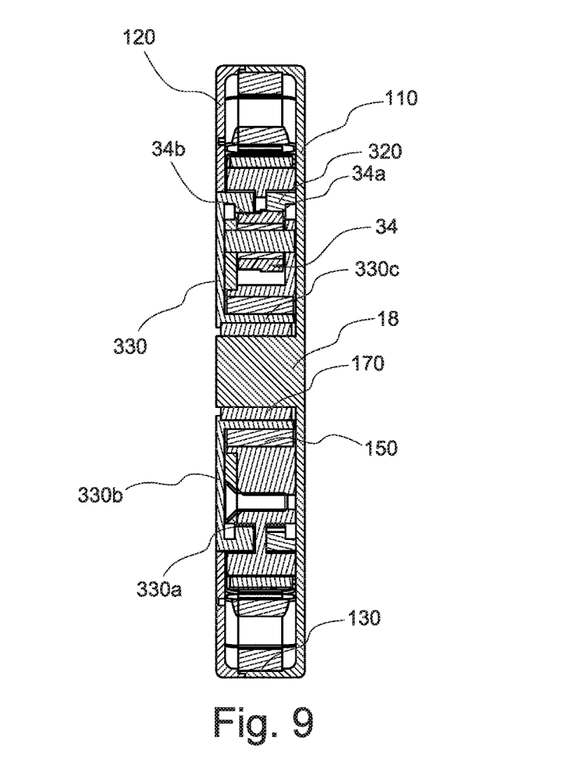
FIG. 9 is a longitudinal sectional view of the assembled gear motor of FIG. 7.

Referring to FIGS. 7 to 9, a gear motor in accordance with a second preferred embodiment of the invention is shown. The characteristics of the second preferred embodiment are substantially the same as that of the first preferred embodiment except the following:

A central opening 140 is formed through a second shell 120 of a housing 100. Power output is transmitted through the opening 140 to a load which is disposed externally of the housing 100. A support cylinder 18 is formed on a center of one surface of a first shell 110 opposing the second shell 120 and the support cylinder 18 extends toward the second shell 120. A hollow cylinder 330c is formed on a center of one surface of a disc 330b of a driving ring gear unit 330 and put around the support cylinder 18. A first bearing 170 is mounted between the hollow cylinder 330c and the support cylinder 18. The disc 330b is formed between a driving ring gear 330a and the hollow cylinder 330c and served as output of the motor. The hollow cylinder 330c is put on the second bearing 150. The annular rotor 21 thus can rotate on the hollow cylinder 330c in the housing 100. The disc 330b is disposed in the opening 140 to be exposed on the housing 100. It is noted that no driving shaft is provided in the embodiment.

In response to rotating the rotor 22, the annular rotor 21 rotates. And in turn, the carrier 24 rotates. Also, the planet gear assemblies 34 rotate about the support cylinder 18. The first gears 34a, having the modulus X and meshing the stationary ring gear 320, rotate. The first and second gears 34a, 34b are arranged coaxially. In response to rotating the first gear 34a, the second gear 34b also rotates. That is, each of the first and second gears 34a, 34b turns and together they move around the support cylinder 18. For decreasing speed of the motor at its output, the first gears 34a having the modulus X mesh the stationary ring gear 320 having the number of the teeth being A, and the second gears 34b having the modulus Y mesh the driving ring gear 330a having the number of the teeth being B. The stationary ring gear 320 is fastened in the first shell 110 and not rotatable. The driving ring gear 330a, having the number of the teeth being B which is different from the number of the teeth being A of the stationary ring gear 320, may rotate the driving ring gear 330a in a low speed. As a result, output speed of the rotatable disc 330b is decreased. Speed reduction ratio of the gear motor of the second preferred embodiment of the invention is the same as that of the gear motor of the first preferred embodiment of the invention.

Figure 10:
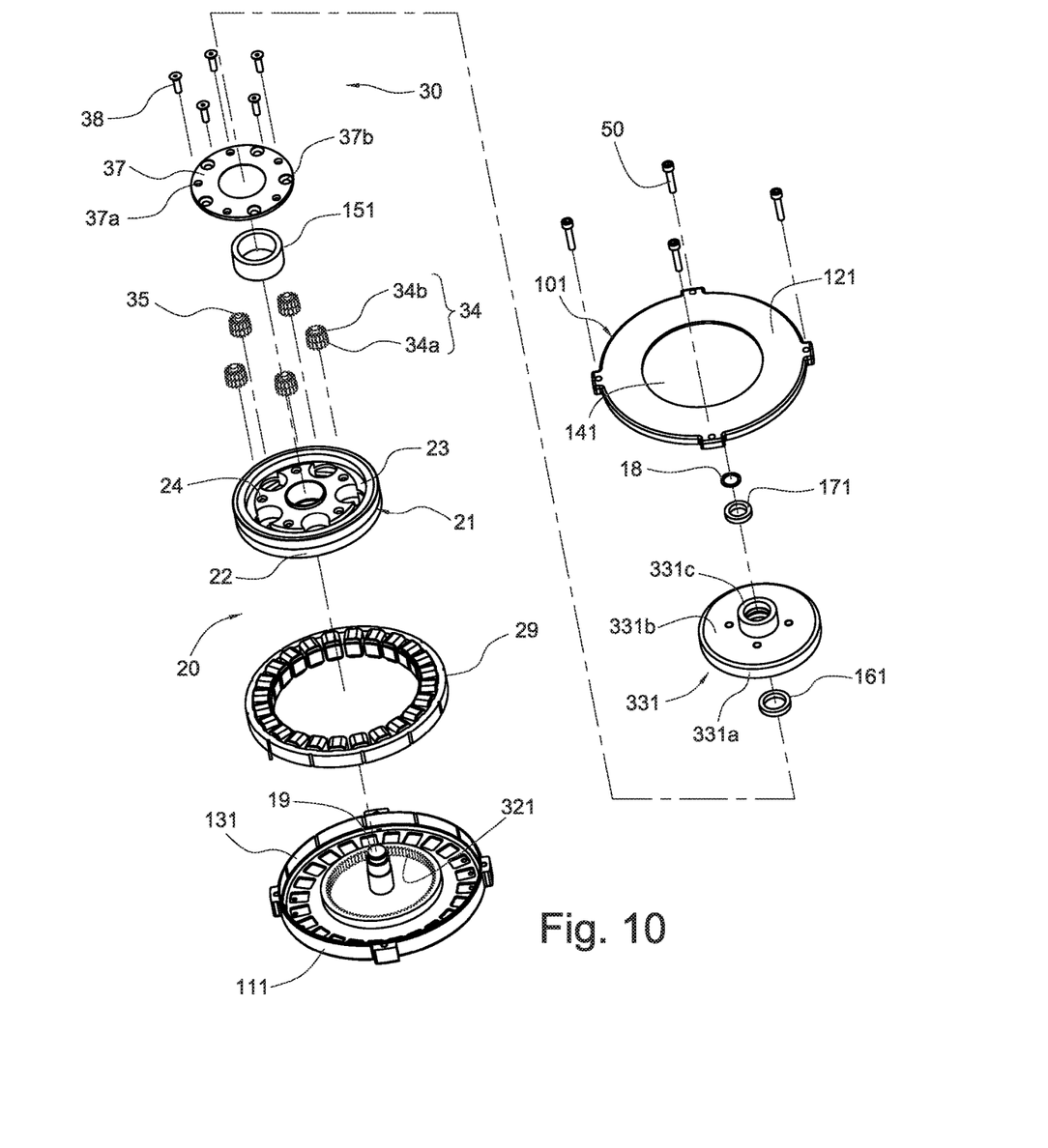
FIG. 10 is an exploded view of a gear motor according to a third preferred embodiment of the invention.
Figure 11:
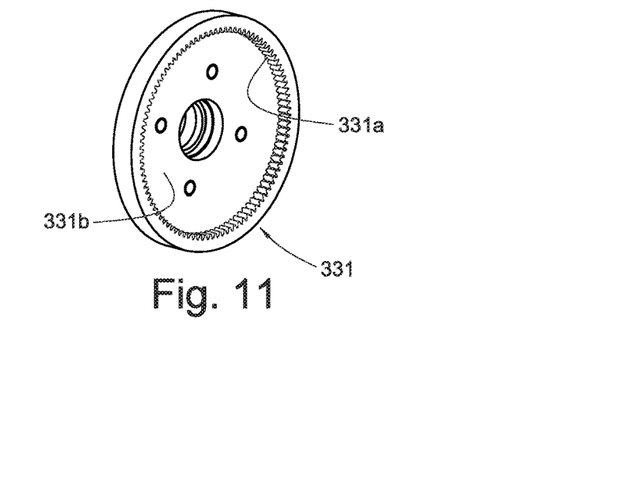
FIG. 11 is a perspective view of the driving ring gear of FIG. 10.
Figure 12:
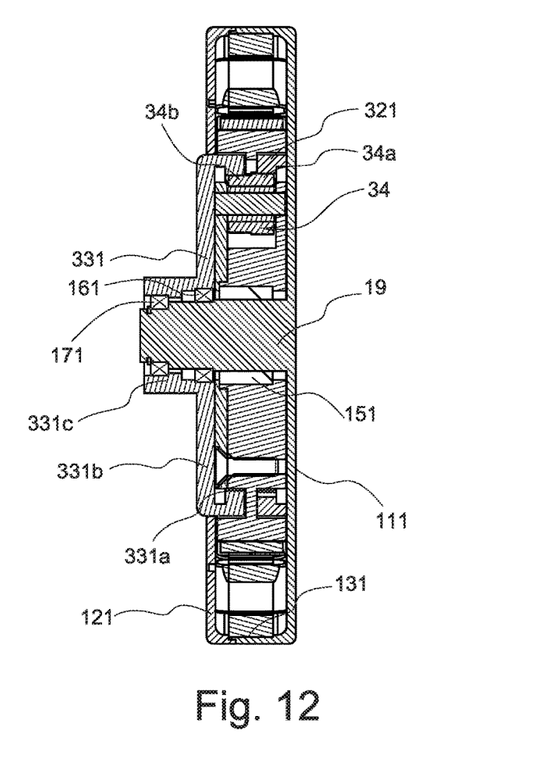
FIG. 12 is a longitudinal sectional view of the assembled gear motor of FIG. 10.

Referring to FIGS. 10 to 12, a gear motor in accordance with a third preferred embodiment of the invention is shown. The characteristics of the third preferred embodiment are substantially the same as that of the first and second referred embodiments except the following:

A central opening 141 is formed through a second shell 121 of a housing 101. Power output is transmitted through the opening 141 to a load which is disposed externally of the housing 101. A support cylinder 19 is formed on a center of one surface of a first shell 111 opposing the second shell 121 and the support cylinder 19 extends toward the second shell 121. A hollow cylinder 331c is formed on a center of one surface of a disc 331b of a driving ring gear unit 331 and put around the support cylinder 19. The driving ring gear unit 331 includes the disc 331b and a driving ring gear 331a. A first bearing 161 and a second bearing 171 are put on the support cylinder 19 and the hollow cylinder 331c is put on both the first and second bearings 161 and 171. The disc 331b is formed between a driving ring gear 331a and the hollow cylinder 331c. The disc 331b is served as a second output of the motor in addition to the hollow cylinder 331c which is a first output of the motor. The annular rotor 21 thus can rotate on the support cylinder 19 in the housing 101. Both the disc 331b and the hollow cylinder 331c are disposed in the opening 141 to be exposed on the housing 101.

In response to rotating the rotor 22, the annular rotor 21 rotates. And in turn, the carrier 24 rotates. Also, the planet gear assemblies 34 rotate about the support cylinder 19. The first gears 34a, having the modulus X and meshing the stationary ring gear 321, rotate. The first and second gears 34a, 34b are arranged coaxially. In response to rotating the first gear 34a, the second gear 34b also rotates. That is, each of the first and second gears 34a, 34b turns and together they move around the support cylinder 19. For decreasing speed of the motor at its output, the first gears 34a having the modulus X mesh the stationary ring gear 321 having the number of the teeth being A, and the second gears 34b having the modulus Y mesh the driving ring gear 331a having the number of the teeth being B. The stationary ring gear 321 is fastened in the first shell 110 and not rotatable. The driving ring gear 331a, having the number of the teeth being B which is different from the number of the teeth being A of the stationary ring gear 321, may rotate the driving ring gear 331a in a low speed. As a result, output speeds of both the rotatable disc 331b and the hollow cylinder 331c are decreased. Speed reduction ratio of the gear motor of the third preferred embodiment of the invention is the same as that of the gear motor of the first preferred embodiment of the invention.

The characteristics of the invention are briefed below. Two ring gears are taken as a replacement of the sun gear in the conventional planetary gear train. The two ring gears of the planetary gear train are disposed at two ends of the motor respectively. A high speed reduction ratio of the gear motor can be expressed below. The number of the teeth of the driving ring gear is divided by a number which is obtained by taking the number of the teeth of the stationary ring gear away from the number of the teeth of the driving ring gear. Space of the gear motor is greatly decreased. The number of components is decreased to simplify the construction. A pancake motor is implemented.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A gear motor comprising:

a housing;

an electric motor including an outer stator and a rotor surrounded and driven by the outer stator;

a planetary gear train including a plurality of planet gear assemblies, a stationary ring gear at one end of the planet gear assemblies, and a driving ring gear at the other end of the planet gear assemblies wherein the planet gear assemblies are positioned between the stationary ring gear and the driving ring gear, each planet gear assembly includes a first gear and a second gear coaxial with and co-rotated with the first gear, the first and second gears are disposed in a carrier, the first gear meshes the stationary ring gear, and the second gear meshes the driving ring gear;

a driving shaft rotatably disposed through the housing and secured to the driving ring gear as a power output;

wherein the rotor and the carrier are secured together to form an annular rotor having a central opening put on the driving shaft, two spaces are formed at two ends of the carrier respectively, each space being configured to receive either the stationary ring gear or the driving ring gear, the number of the teeth of the first gear is equal to that of the teeth of the second gear, the number of the teeth of the stationary ring gear is different from that of the teeth of the driving ring gear, and a difference between the number of the teeth of the stationary ring gear and that of the teeth of the driving ring gear is a multiple of the number of the planet gear assemblies; and an annular plate for fastening the outer rotor and the carrier together, and wherein the spaces are disposed at two ends of both the annular plate and the carrier respectively.

2. The gear motor of claim 1, wherein a difference between the number of the teeth of the stationary ring gear and the number of the teeth of the driving ring gear is equal to the number of the planet gear assemblies.

3. The gear motor of claim 1, wherein the modulus of the first gear is different from the modulus of the second gear, the modulus of the stationary ring gear is equal to that of the first gear, and the modulus of the driving ring gear is equal to that of the second gear.

4. The gear motor of claim 1, wherein the stationary ring gear is fastened in the housing.

5. The gear motor of claim 1, further comprising first and second carrier discs disposed at two ends of the planet gear assemblies respectively, wherein the first and second carrier discs constrain the planet gear assembly in position, and wherein the first and second gears are configured to rotate about the driving shaft.

6. The gear motor of claim 5, further comprising a plurality of axles each disposed through the first and second gears of each planet gear assembly, and wherein two ends of each axle engage the first and second carrier discs respectively.

7. The gear motor of claim 1, further comprising a disc for attaching the driving ring gear to the driving shaft.

8. The gear motor of claim 1, wherein the electric motor is a brushless direct current motor.

9. A gear motor comprising:

a housing having a first shell and a second shell, the second shell including a central opening and releasably secured to the first shell;

an electric motor disposed in the housing and including an outer stator and a rotor surrounded and driven by the outer stator;

a planetary gear train disposed in the housing and including a plurality of planet gear assemblies, a stationary ring gear at one end of the planet gear assemblies, and a driving ring gear at the other end of the planet gear assemblies wherein the planet gear assemblies are positioned between the stationary ring gear and the driving ring gear, each planet gear assembly includes a first gear and a second gear coaxial with and co-rotated with the first gear, the first and second gears are disposed in a carrier, the first gear meshes the stationary ring gear, and the second gear meshes the driving ring gear;

a power output secured to the driving ring gear, the power output rotatably disposed through the central opening of the second shell to be exposed on the housing;

a support cylinder disposed on a center of one surface of the first shell opposing the second shell, the support cylinder extending toward the second shell;

wherein the rotor and the carrier are secured together to form an annular rotor having a central opening put on the support cylinder, two spaces are formed at two ends of the carrier respectively, each space being configured to receive either the stationary ring gear or the driving ring gear, the number of the teeth of the first gear is equal to that of the teeth of the second gear, the number of the teeth of the stationary ring gear is different from that of the teeth of the driving ring gear, and a difference between the number of the teeth of the stationary ring gear and that of the teeth of the driving ring gear is a multiple of the number of the planet gear assemblies; and an annular plate for fastening the outer rotor and the carrier together, and wherein the spaces are disposed at two ends of both the annular plate and the carrier respectively.

10. The gear motor of claim 9, wherein a difference between the number of the teeth of the stationary ring gear and the number of the teeth of the driving ring gear is equal to the number of the planet gear assemblies.

11. The gear motor of claim 9, wherein the modulus of the first gear is different from the modulus of the second gear, the modulus of the stationary ring gear is equal to that of the first gear, and the modulus of the driving ring gear is equal to that of the second gear.

12. The gear motor of claim 9, wherein the stationary ring gear is fastened in the housing.

13. The gear motor of claim 9, further comprising first and second carrier discs disposed at two ends of the planet gear assemblies respectively, wherein the first and second carrier discs constrain the planet gear assembly in position, and wherein the first and second gears are configured to rotate about the support cylinder.

14. The gear motor of claim 13, further comprising a plurality of axles each disposed through the first and second gears of each planet gear assembly, and wherein two ends of each axle engage the first and second carrier discs respectively.

15. The gear motor of claim 9, further comprising a disc as the power output.

16. The gear motor of claim 9, further comprising a driving shaft through the disc, and wherein the driving shaft serves as a second power output.

17. The gear motor of claim 9, wherein the electric motor is a brushless direct current motor.

* * * * *